United States Patent
Vanderzee et al.

(10) Patent No.: US 7,020,156 B2
(45) Date of Patent: Mar. 28, 2006

(54) MULTIPLE DEVICE COMMUNICATIONS

(75) Inventors: Joel C. Vanderzee, La Crosse, WI (US); Robert M. Swanson, La Crosse, WI (US)

(73) Assignee: American Standard International Inc., New York, NY (US)

( * ) Notice: Subject to any disclaimer, the term of this patent is extended or adjusted under 35 U.S.C. 154(b) by 690 days.

(21) Appl. No.: 09/738,834

(22) Filed: Dec. 15, 2000

(65) Prior Publication Data

US 2002/0075885 A1    Jun. 20, 2002

(51) Int. Cl.
*H04L 12/403* (2006.01)
*H04L 12/56* (2006.01)
*H04L 12/43* (2006.01)

(52) U.S. Cl. .................. 370/451; 370/392; 370/461

(58) Field of Classification Search ............... 370/514, 370/513, 447, 445, 451, 452, 470, 459–462, 370/392, 389, 438
See application file for complete search history.

(56) References Cited

U.S. PATENT DOCUMENTS

| | | | |
|---|---|---|---|
| 4,654,889 A * | 3/1987 | Shutterly ................... 398/60 |
| 5,088,024 A * | 2/1992 | Vernon et al. ............... 710/111 |
| 5,132,967 A * | 7/1992 | Kalajainen .................. 370/462 |
| 5,323,385 A | 6/1994 | Jurewicz et al. |
| 5,831,848 A | 11/1998 | Rielly et al. |
| 5,898,694 A * | 4/1999 | Ilyadis et al. ............... 370/462 |
| 6,167,057 A * | 12/2000 | Kishigami et al. .......... 370/445 |
| 6,359,899 B1 * | 3/2002 | Krishnakumar et al. .... 370/444 |
| 6,674,750 B1 * | 1/2004 | Castellano ................... 370/462 |
| 6,691,172 B1 * | 2/2004 | Clow et al. .................. 709/246 |
| 6,744,761 B1 * | 6/2004 | Neumann et al. ........... 370/389 |
| 2002/0071477 A1 * | 6/2002 | Orava ......................... 375/132 |

OTHER PUBLICATIONS

Newton, Newton's Telecom Dictionary, Oct. 1998, Telecom Books, p. 61.*

* cited by examiner

*Primary Examiner*—Chi Pham
*Assistant Examiner*—Ronald Abelson
(74) *Attorney, Agent, or Firm*—William J. Beres; William O'Driscoll

(57) ABSTRACT

A communications protocol for a communications bus wherein messages are transmitted to a plurality of devices communicating by a bus. Each message includes a unique code indicating the end of the message and that same unique code triggers a transfer of communications control to another device of the plurality of devices.

19 Claims, 1 Drawing Sheet

MULTIPLE DEVICE COMMUNICATIONS

BACKGROUND OF THE INVENTION

The present invention provides simple, fast, efficient and flexible communications apparatus, method and protocol between a plurality of electronic devices communicating over a common medium in a communications system.

Prior designs and existing communications apparatus and methods have distinct drawbacks. Some use master-slave protocols that are simple but inefficient. Some use multiple access protocols that allow collisions requiring either complex hardware or software. Some use token passing protocols that are both inefficient and complex. Operations in either or both master/slave or peer-to-peer communications modes are desirable over an extended product lifetime.

SUMMARY OF THE INVENTION

It is an object, feature and advantage of the present invention to avoid the problems and restrictions present in prior designs and available industry communications protocols.

It is an object, feature and advantage of the present invention to provide operation in either or both master/slave and peer-to-peer communications modes over an extended product lifetime.

It is an object, feature and advantage of the present invention to provide simple, automatic bus control sharing between devices. It is a further object, feature and advantage of the present invention to include the capability to add bus control features to all devices to allow master-less operation.

It is an object, feature and advantage of the present invention to provide a communications protocol where a unique byte code is detected by low level hardware, firmware or software to identify the end of one device's message.

It is a further object, feature and advantage of the present invention that the unique byte code, upon detection, cause an inherent change in bus control. It is a further object, feature and advantage of the present invention that the use of a simple byte code accomplishes a sequence of bus control transfers with only a single byte and minimum bus timing needs being met.

It is an object, feature and advantage of the present invention to provide a communications protocol that is simple. It is a further object, feature and advantage of the present invention that that bus control transfers use a simple mechanism requiring only the interpretation of an eight bit code and sequential action based on the operation of a typical UART. It is a further object, feature and advantage of the present invention that the protocol be efficient in requiring little overhead for bus control requirements. It is a still further object, feature and advantage of the present invention that the protocol be fast and transfer bus control to each device after minimal delay. It is another object, feature and advantage of the present invention that the protocol be flexible in allowing very simple functions and messages to be constructed using minimal microcomputer resources while also allowing more complex messages provided by computers with more resources. It is another object, feature and advantage of the present invention that master/slave and peer-to-peer operation coexist within a common communications protocol. It is a further object, feature and advantage of the present invention that polling can be implemented within that protocol.

The present invention provides a device communications. The device communications comprises: a plurality of communicating devices; a communications media communicably connecting the plurality of devices; and a sequential identifier for each of the plurality of devices. The identifier provides a unique identity for each device and provides a sequence order for all of the plurality of devices. The device communications also comprises: a unique code; and a protocol wherein each device transmits the unique code on the communications media in the sequence order if the device has nothing to report, transmits the sequence identifier of another device followed by data followed by the unique code if the device has information to report, and transmits the sequential identifier of another device followed by the unique code if the transmitting device desires to change out of sequence to a different device in the sequence order.

The present invention also provides a method of communications for a communications bus communicably connecting a plurality of communications devices. The method comprising the steps of: assigning an identifier and a sequence order to each of the multiplicity of devices; transmitting, continuously and in sequence order, a message on the bus from each of the multiplicity of devices; and terminating each message with a unique code. The message comprises the unique code alone if the device has no other message to transmit. The message comprises the identifier for another device and the unique code if the transmitting device desires to move elsewhere in the sequence order. The message comprises the identifier for another device, data and the unique code if the transmitting device has a report to make.

The present invention further provides a method of communicating between a plurality of devices communicably connected by a communications medium. The method comprising the steps of: sequencing the plurality of devices into a sequence order; transmitting a message on the communications medium from one of the plurality of devices having communications control over the communications medium; receiving the message from the communications medium at each of the plurality of devices; determining, at each of the plurality of devices, if the message is: a unique code, or a combination of a sequence identifier and a unique code; incrementing communications control to the next device of the plurality of devices in the sequence order if the message is the unique code; and transferring communications control to a device identified in the sequence identifier if the message is a combination of the sequence identifier and the unique code.

The present invention still further provides a communications protocol for a communications bus wherein messages are transmitted to a plurality of devices communicating by means of a bus. Each message includes a unique code indicating the end of the message and that same unique code triggers a transfer of communications control to another device of the plurality of devices.

DETAILED DESCRIPTION OF THE INVENTION

Figure 1:
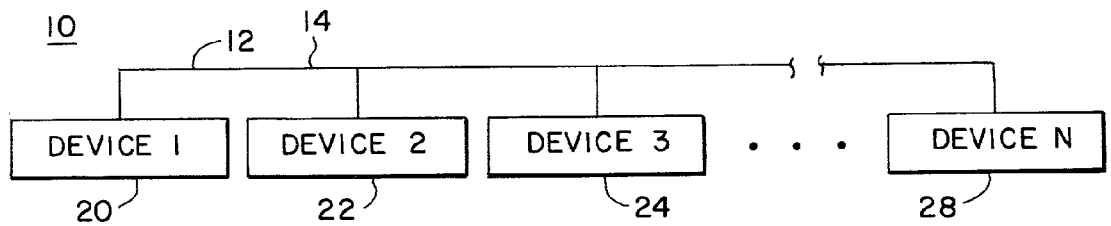
FIG. 1 is a block diagram of a communications system to which the present invention is applicable.

FIG. 1 shows a communications system 10 including a communications medium 12 such as a communications bus 14. The bus 14 is preferably implemented in the form of a flat, four wire ribbon cable using standard universal asynchronous receiver/transmitter (UART) resources for eight bit communications where two of the four wires provide power and common connections and the other two of the four wires provide communications using conventional RS-485 protocol. Although described in terms of a flat ribbon connector and RS-485, a person of ordinary skill in the art will recognize that the communications media 12 can be implemented in a wide variety of manners including wireless communications, spread spectrum RF communications, fiber optic media, coaxial cable, and other communications connectors using a variety of protocols appropriate for the media.

The communications media 12 communicably and operably interconnects a plurality of electronic devices 20, 22, 24 and 28. These devices 20, 22, 24, 28 are arranged into a sequence order where each device 20, 22, 24, 28 has a sequence identifier providing both an identity and a place in the sequence order. In the case of the device 20, the identifier and place are the whole number "1"; in the case of the device 22 the identifier and place are the whole number "2"; in the case of the device 24 the identifier and place are the whole number "3"; and so on through the device 28 which has the identifier and last place in the sequence order as indicated by the letter "N". By linking the place in the sequence order with the device identifier, it is simple to increment through the sequence order device by device. However, a person of ordinary skill in the art will recognize that the identifier and the place in the sequence order can be distinct and linked in any conventional manner. Additionally, although the present invention contemplates incrementing from device to device by adding the value 1 when transferring bus control, a person of ordinary skill in the art will recognize that more complicated sequences will also achieve the same result.

The present invention combines master/slave and peer-to-peer communications modes into the communications system 10 by providing a communications message which works in a round robin format but has an end of transmission handoff allowing sequential or non-sequential changes in the order of handoff. This is accomplished through the use a unique termination code such as a unique code 18. The unique code 18 is preferably implemented as a single byte with a specified value, but could be implemented as a multi-byte code, or as a group of unique codes. For purposes of this application, all such approaches are defined as the unique code 18.

The unique code 18 is detected by low level hardware, software or firmware to identify the end of a message transmitted by one device, for example device 20, and cause an inherent change in bus control to the next device 22 in the sequence order. In the present invention, the sequence order is incremented by whole number addition from device 1 to device 2 to device 3 and so on to device N whereupon the sequence restarts at device 1. The plurality of devices 20, 22, 24, 28 are preferably placed in a sequence order at the time of system configuration; the sequence order, as noted, running from device 1 through device N and then restarting at device 1.

Device 1 would normally commence with communications control over the communications media 12. If device 1 had no commands or data to transmit or request, device 1 would transmit the unique code 18 on the communications media 12 to all of the plurality of devices 20, 22, 24, 28 in the form of a message 32. Each device 20, 22, 24, 28 receives the message 32 on the communications media 12 and determines if the message 32 is the unique code 18 by itself, or a combination of a sequence identifier 42 and a unique code 18, or a combination of a sequence identifier 42, data 46, and a unique code 18. In the message 32, the unique code 18 always is the message terminator and the type or nature of the message 32 is determined, in part, by the length of the message 32 preceding the unique code 18. If the message 32 is of a short length, the message is solely the unique code 18, and each device 20, 22, 24, 28 will recognize that communications control over the communications media 12 should be transferred to the next device 20, 22, 24, 28 in the sequence order. If the devices 20, 22, 24, 28 are sequenced by whole numbers, this transfer of control is accomplished by adding 1 to the sequence identifier 42 of the device currently controlling bus communications.

If the message 32 is an intermediate length message, the message includes a sequence identifier 42, and each device 20, 22, 24, 28 will recognize the sequence identifier 42 and substitute that newly recognized sequence identifier 42 as and into communications control of the communications media 12 thereby moving elsewhere in the order of sequence order. The sequence identifier 42 can be considered to identify the next device or node to assume communications control.

If the message 32 is a longer length message, the message 32 includes data 46 providing a command, or reporting information, the device 20, 22, 24, 28 will act upon that data 46 if it is relevant to the particular device and then transfers control to the device identified in the sequence identifier 42. Each message 32 will transfer communications control to either the next device in the sequence order or will transfer control to another device elsewhere in the sequence order, depending upon whether the message 32 is respectively the unique code 18, or a sequence identifier and unique code 18.

Figure 2:
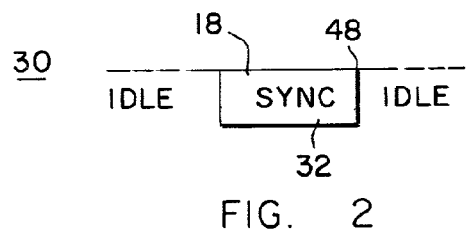
FIG. 2 is a block diagram of a transmission of the unique byte code of the present invention as implemented on a communication system such as that shown in FIG. 1.

FIG. 2 is a block diagram 30 of a message 32 on the communications media 12. This message 32 is clearly the shortest of the three message formats shown in FIGS. 2–4. The message 32 in this case is the unique code 18. This unique code 18 can be representative of a SYNC byte and is preferable, but not necessarily, an eight bit code which can easily be interpreted by a typical UART. It is also preferable that the unique code 18 be a single byte to provide for fast or best communications. A person of ordinary skill in the art will recognize that two or more preselected codes could be used in place of a single unique code and still achieve similar results.

Figure 3:
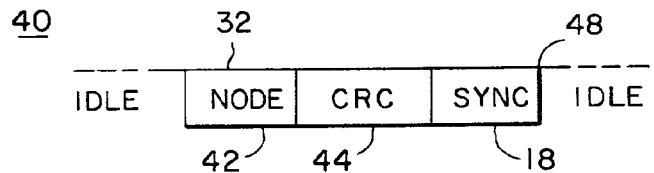
FIG. 3 is a block diagram of a bus message in accordance with the present invention transferring communications control in a non-sequential manner.

FIG. 3 is a block diagram 40 of a message 32 on the bus wherein the message includes a sequence identifier 42, the unique code 18, and, potentially, data security information 44.

Figure 4:
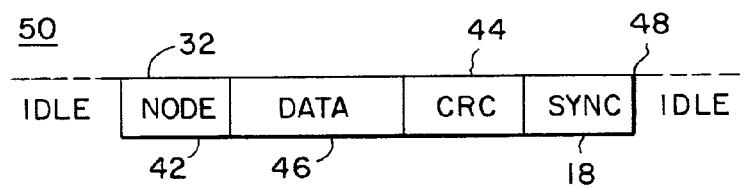
FIG. 4 is a block diagram of a bus message in accordance with the present invention transferring data in a communications system of FIG. 1.

FIG. 4 is a block diagram 50 of a message 32 on the communications media 12 wherein the message includes a sequence identifier 42, data 46 such as a command, or a report providing change of state or status information, the security data 44 and the unique code 18 at the end of the message 48. This message 32 is clearly the longest of the three message formats shown in FIGS. 2–4.

What has been described is a communications protocol which combines master/slave and peer-to-peer communications modes in a fast, flexible, efficient and simple manner. A person of ordinary skill in the art will recognize that many changes and modifications are possible through such a system. All such changes and modifications are contemplated to fall within the spirit and scope of the claimed invention.

What is desired to be secured for Letters Patent of the United States is set forth in the following claims.

The invention claimed is:

1. A communications system using a communications protocol for a communications bus wherein messages are transmitted to a plurality of devices communicating by means of a bus wherein each message includes a unique code indicating the end of the message and wherein that same unique code triggers a transfer of communications control to another device of the plurality of devices;
   wherein the transmitted messages are in first, second, and third formats, each of the first, second, and third formats having a distinguishable length.

2. The protocol of claim 1 wherein the first message format comprises only the unique code, and indicates to the plurality of devices that communications control should be transferred to the next of the plurality of devices in a predetermined sequence.

3. The protocol of claim 2 wherein the second message format comprises a sequence identifier and the unique code, and indicates to the plurality of devices that communications control should be transferred to a device of the plurality of devices which is identified by the sequence identifier.

4. The protocol of claim 3 wherein the third message format comprises a sequence identifier, data, and the unique code.

5. The protocol of claim 4 wherein the unique code is a single byte, eight bits, a SYNC byte, or two or more preselected bytes.

6. The protocol of claim 5 wherein the two or more preselected bytes are used in combination to form the unique code.

7. The protocol of claim 5 wherein any one of the two or more preselected bytes comprises the unique code.

8. The protocol of claim 5 wherein the bus is a flat ribbon cable.

9. A communications system using a communications protocol for a communications bus wherein messages are transmitted to a plurality of devices communicating by means of a bus wherein each message includes a unique code indicating the end of the message and wherein that same unique code triggers a transfer of communications control to another device of the plurality of devices;
   wherein communications control between the plurality of device is a hybrid of peer-to-peer and master/slave protocols.

10. A device communications comprising:
    a plurality of communicating devices;
    a communications media communicably connecting the plurality of devices;
    a sequential identifier for each of the plurality of devices, the identifier providing a unique identity for each device and providing a sequence order for all of the plurality of devices;
    a unique code; and
    a protocol wherein each device transmits the unique code on the communications media in the sequence order if the device has nothing to report, transmits the sequence identifier of another device followed by data followed by the unique code if the device has information to report, and transmits the sequential identifier of another device followed by the unique code if the transmitting device desires to change out of sequence to a different device in the sequence order.

11. The device communications of claim 10 wherein the unique code is a single byte, eight bits, or a sync byte.

12. The device communications of claim 10 wherein every device receiving a message determines if the unique code is the entire message.

13. The device communications of claim 12 wherein if the entire message is the unique code, the device increments a sequence counter to identify the next device in the sequence order.

14. The device communications of claim 13 wherein the type of message is at least partially identified by the length of the message.

15. A method of communications for a communications bus communicably connecting a plurality of communications devices, the method comprising the steps of:
    assigning an identifier and a sequence order to each of the multiplicity of devices;
    transmitting, continuously and in sequence order, a message on the bus from each of the multiplicity of devices;
    terminating each message with a unique code;
    wherein the message comprises the unique code alone if the device has no other message to transmit;
    wherein the message comprises the identifier for another device and the unique code if the transmitting device desires to move elsewhere in the sequence order; and
    wherein the message comprises the identifier for another device, data and the unique code if the transmitting device has a report to make.

16. The method of claim 15 wherein the unique code is a single byte, eight bits, a sync bit, or two or more preselected bytes.

17. The method of claim 16 wherein the two or more preselected bytes are used separately.

18. A method of communicating between a plurality of devices communicably connected by a communications medium, the method comprising the steps of:
    sequencing the plurality of devices into a sequence order;
    transmitting a message on the communications medium from one of the plurality of devices having communications control over the communications medium;
    receiving the message from the communications medium at each of the plurality of devices;
    determining, at each of the plurality of devices, if the message is: a unique code, or a combination of a sequence identifier and a unique code;
    incrementing communications control to the next device of the plurality of devices in the sequence order if the message is the unique code; and
    transferring communications control to a device identified in the sequence identifier if the message is a combination of the sequence identifier and the unique code.

19. The method of claim 18 wherein the determining step further determines if the message, is a combination of data and the unique code and the incrementing step also increments or transfers communications control if the message is the combination of data and the unique code.

* * * * *